United States Patent [19]
Tate

[11] 3,860,072
[45] Jan. 14, 1975

[54] METHOD FOR OIL RECOVERY

[75] Inventor: Jack F. Tate, Houston, Tex.

[73] Assignee: Texaco Inc., New York, N.Y.

[22] Filed: Dec. 26, 1973

[21] Appl. No.: 428,549

[52] U.S. Cl. .............................. 166/308, 166/305 R
[51] Int. Cl. ............................................ E21b 43/26
[58] Field of Search........ 166/308, 305 R, 307, 259, 166/271, 280, 281, 283, 273–275; 252/8.55 R

[56] References Cited
UNITED STATES PATENTS

| | | | |
|---|---|---|---|
| 3,500,920 | 3/1970 | Raifsnider............................ | 166/273 |
| 3,508,612 | 4/1970 | Reisberg et al..................... | 166/274 |
| 3,610,339 | 10/1971 | Harvey................................. | 166/274 |
| 3,663,477 | 5/1972 | Ahearn............................ | 166/308 X |
| 3,712,377 | 1/1973 | Hill et al............................ | 166/273 X |
| 3,811,504 | 5/1974 | Flournoy et al. ................ | 166/274 X |
| 3,811,505 | 5/1974 | Flournoy et al. ................... | 166/274 |
| 3,811,507 | 5/1974 | Flournoy et al. ................... | 166/274 |

*Primary Examiner*—Stephen J. Novosad
*Attorney, Agent, or Firm*—T. H. Whaley; C. G. Ries

[57] ABSTRACT

The production of hydrocarbons from a subterranean hydrocarbon-bearing formation is stimulated by injecting into the formation an aqueous solution of a surfactant admixture. The elimination of plugging of capillary openings within the formation and mineral scale deposition on production equipment due to post-precipitation of dissolved salts subsequent to treatment by means of said surfactant admixture results in a substantial improvement in hydrocarbon recovery.

10 Claims, No Drawings

METHOD FOR OIL RECOVERY

FIELD OF THE INVENTION

This invention relates to a method for stimulating the production of fluids from earthen formations. More particularly, this invention relates to a method in which the productivity of a hydrocarbon-bearing formation is improved upon treatment of the formation with an aqueous solution of a surfactant admixture, said surfactant system effecting the elimination of plugging of capillary openings due to post-precipitation of sparingly soluble salts, effecting elimination of mineral scale on production equipment such as pumps, tubing, etc., caused by such precipitation, and effecting enhanced oil recovery by reduction of retentive forces of capillarity.

DESCRIPTION OF THE PRIOR ART

The technique of increasing the deliverability of a subterranean hydrocarbon-bearing formation by injection of water and thereby stimulating the production of fluids therefrom has long been practiced in the art. The technique is applicable in both limestone and sandstone. In the usual treatment procedure, the aqueous medium is introduced into the well and under sufficient pressure is forced into the adjacent subterranean formation where it dissolves formation components, particularly the carbonates such as calcium carbonate and magnesium carbonate.

During the stimulation process passageways for fluid flow are created or existing passageways therein are enlarged thus stimulating the production of oil, water, brines and various gases. If desired, the stimulation may be carried out at an injection pressure sufficiently great to create fractures in the strata or formation which has the desired advantage of opening up passageways into the formation along which the aqueous meidum can travel to more remote areas from the well bore.

There are, however, troublesome complications attending the use of this process. After stimulation is completed, the well is put back on production. The sparingly soluble carbonates, dissolved at the higher reservoir temperatures, may re-precipitate as temperature and hence solubility decrease. Such precipitation, when it occurs within the capillaries of a tight formation or on the tubing or annulus as a mineral scale, can severely lessen production rate by plugging such capillaries or well equipment. In actual practice, the short-lived effectiveness of some stimulations is attributed to salt re-deposition.

In addition, with the exception of increasing the drainage area, and therefore the average permeability by matrix dissolution or hydraulic fracturing, little benefit is obtained. The complete immiscibility of the oil in the water and the retentive forces of capillarity which maintain the oil in the matrix severely limit the production of incremental oil by mere injection of water alone.

It is therefore, the principal object of the present invention to overcome the defects of the prior art in treating fluid-bearing formations such as hydrocarbon-bearing formations, etc., by providing a method of and composition for stimulation employing the novel composition of this invention.

SUMMARY OF THE INVENTION

This invention encompasses and includes a method of and composition for increasing the production of fluids from a subterranean fluid-bearing formation comprising injecting down the well bore to said formation and therefrom into said formation under a pressure greater than the formation pressure an aqueous surfactant admixture hereinafter more fully described, optionally containing a propping agent therewith, maintaining said aqueous admixture in contact with the formation strata for a time sufficient for the surfactant admixture to chemically react with the components of the formation.

The novel aqueous surfactant admixture of this invention comprises an aqueous solution having dissolved therein a surfactant admixture hereinafter described. The concentration of the surfactant admixture present in the aqueous solution is such that it is capable of reacting with the soluble components of the fluid-bearing strata so as to prevent reprecipitation of sparingly soluble salts and enhance oil production by reducing retentive forces of capillarity.

DETAILED DESCRIPTION OF THE INVENTION

In its broadest embodiment the method of and composition for the present invention comprises introducing into a subsurface formation an aqueous solution of a surfactant admixture hereinafter described wherein the said solution is maintained in contact with the formation for a time sufficient to chemically react with the formation so as to increase substantially the flow capabilities of the formation by reducing interfacial tension and hence retentive forces of capillarity.

An advantage resulting from the employment of the method of this invention in stimulating fluid-bearing formations is that the post-precipitation of dissolved carbonates is prevented or materially decreased. Such post-precipitation occurs because the salts become less soluble as temperatures decrease. Such a decrease occurs as the fluids near the production equipment. Such post-precipitation occurring within the formation matrix near the bore hole can decrease permeability by plugging the formation capillaries, particularly those near the well bore, and result in a lower production rate. Furthermore, such post-precipitation can occur in the tubing or annulus of the well itself and manifest itself as mineral scale, reducing their diameter(s) and resulting in a lower production rate.

The admixture useful in preparing the aqueous solution of the present invention is formed from about one part by weight of a sulfated/sulfonated polyethoxy alkyl phenol containing from about 8 to about 14 carbon atoms in the alkyl group and from about 4 to about 10 ethoxy groups, together with from about 1 to 3 parts by weight of a $C_8$–$C_{14}$ alkyl benzene sulfonic acid, including the alkali metal and ammonium salts of one or both compounds, as well as mixtures thereof.

Representative sulfated/sulfonated polyethoxy alkyl phenols include the octyl-, nonyl-, decyl-, undecyl-, dodecyl-, tridecyl- and tetradecyl-phenols ethoxylated with about 4 to about 10 ethoxy groups, such as the tetraethoxy-, hexaethoxy-, octaethoxy-, and decaethoxy adducts of the above nonyl phenols, the ammonium, sodium and potassium salts thereof. Particularly preferred compounds are sulfated/sulfonated tetraethoxylated nonyl phenol, sulfated/sulfonated hexaethoxylated nonyl phenol, and sulfated/sulfonated nonyl phenol containing an average of about 9.5 ethoxy groups therein.

Representative alkyl benzene sulfonic acids, including the straight and branched chain alkyl groups, useful in the practice of the invention include the octyl-, nonyl-, decyl-, undecyl-, dodecyl-, tridecyl- and tetradecyl-benzene sulfonic acids, the corresponding sodium, potassium and ammonium salts thereof as well as mixtures of one or more of said compounds. A preferred group is the $C_{10}$-$C_{14}$ alkyl benzene sulfonic acids and the above salts thereof.

As used in the present specifications and claims the expression "sulfated/sulfonated polyethoxy alkyl phenol" refers to the reaction product of a polyethoxy alkyl phenol described hereinabove with chlorosulfonic acid or sulfur trioxide for a time period of from about 5 to 90 minutes at a temperature in the range of from about 50° to 60°C., using a reactant mole ratio of from about one mole of said phenol per 0.8 to 1.3 mole of said chlorosulfonic acid or sulfur trioxide.

Analysis of the resulting reaction products showed that from about 70 to 90 percent thereof was sulfated while the 10 to 30 percent remaining was sulfonated. Accordingly, the term sulfated/sulfonated was used to describe this reaction product.

A preferred set of reaction conditions are from about 55° to about 60°C., 30 to 90 minutes in time and mole ratios of from about 1 mole of said phenol per 1–1.3 mole of the chlorosulfonic acid or sulfur trioxide.

A preferred ratio of the admixture components is about one part by weight of the sulfated/sulfonated polyethoxy alkyl phenol to from about 1.25 to 2.75 parts by weight of the $C_8$–$C_{14}$ alkyl benzene sulfonic acid.

The concentration of the surfactant admixture in the aqueous solution can vary from about 0.005 to about 5 percent by weight of each component, preferably from about 0.05 to about 1 percent by weight of each component of the admixture.

In carrying out the method of this invention, an aqueous solution is prepared by mixing the surfactant admixture with water at the desired concentration. The thus-prepared aqueous solution is forced, usually via a suitable pumping system, down the well bore and into contact with the production equipment and formation to be treated. As those skilled in the art will readily understand, the pressure employed is determined by the nature of the formation, viscosity of the fluid, and other operating variables. The stimulation method of this invention may be carried out at a pressure sufficient merely to penetrate the formation or it may be of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous surfactant admixture. The solution is best kept in contact with the formation and production equipment until the surfactant admixture can adsorb upon the formation matrix and reduce the interfacial tension. After this, the treating solution is reversed out of the well, i.e., it is allowed to flow back out or to be pumped out of the formation.

In the method of this invention, the surfactant admixture of the aqueous solution provides means whereby calcium ions having tendencies to precipitate as $CaCO_3$ or $CaSO_4$ from a super-saturated solution of $CaCO_3$, $Ca(HCO_3)_2$ or $CaSO_4$ that is produced by the reaction of aqueous system with the formation, does not precipitate from the spent treating solution. This binding up of the aforementioned calcium ions from weakly ionizable compounds permits the formed calcium-surfactant complex to remain dissolved in the treating solution and pass through the formation pores and production equipment.

Further, the surfactant admixture of the composition provides means whereby the nucleation and growth of the solid itself is thwarted, so that solid calcium carbonate does not precipitate from the spent treating solution.

Further, the surfactant admixture of the composition provides means whereby continuous protection against post-precipitation of $CaCO_3$, or $CaSO_4$ is obtained for a considerable period of time subsequent to treatment due to continuous slow desorption of the component from the formation surfaces. In contrast, use of surfactants having merely dispersant and suspending properties and not possessing the capability of molecularly binding up these produced calcium ions or thwarting the nucleation and growth of the solid $CaCO_3$ will permit deposition of calcium carbonate or calcium sulfate to occur from such treating solution with the likelihood of plugging the formation passageways and production equipment during subsequent recovery of desirable formation hydrocarbons therethrough. Finally, the surfactant admixture of the composition reduces the retentive forces of capillarity within the formation providing enhanced oil recovery over treatment with water alone.

Following is a description by way of example of the method of the invention.

EXAMPLE I

A producing well in the Lincoln Southeast Field is treated in the following manner.

A treating mixture is prepared by mixing 10,000 gallons of source pond water containing about 400 ppm chloride and 122 ppm calcium with a concentrated solution of the surfactant admixture so that 0.4 percent of the ammonium tridecylbenzene sulfonate and 0.2 percent of the sulfated/sulfonated four mole ethoxylate of nonyl phenol is present in the pond water. Fifteen thousand pounds of frac sand is added to the aqueous surfactant admixture. The treating mixture is introduced into the formation at a rate of about 7 BPM at 3,000 psig. The shut-in tubing pressure is 2,500 psig which bled down to zero in a short time. The well is shut in for 13 hours and then returned to production. Estimated production rate increase is from 50 BOPD to 300 BOPD.

EXAMPLE II

The procedure of Example I is repeated except that the surfactant mixture is formed from 0.4 percent of sodium dodecyl benzene sulfonate and 0.4 percent of sulfated/sulfonated hexaethoxy, nonyl phenol.

EXAMPLE III

The procedure of Example I is repeated except that the surfactant admixture is formed from 0.4 percent of ammonium dodecyl nonyl phenol and 0.2 percent of sulfated/sulfonated polyethoxy nonyl phenol wherein the average number of ethoxy groups therein is about 9.5.

It is significant that the surfactant admixture is an effective material in the presence of high calcium ion concentrations of the order of up to 10,000 ppm or more, for the sulfated/sulfonated polyethoxy alkyl phenols are relatively ineffective at these high calcium ion concentrations and the alkyl benzene sulfonic acids alone are not satisfactory at calcium ion concentrations above about 50 ppm. The admixture appears to stabilize the alkyl benzene sulfonic acid component.

Obviously, many modifications and variations of the invention as hereinabove set forth may be made without departing from the spirit and scope thereof, and therefore only such limitations should be imposed as are indicated in the appended claims.

I claim:

1. Method of increasing and sustaining the production of fluids from a subterranean fluid-bearing formation comprising injecting down the well bore penetrating said formation and injecting therefrom into said formation under a pressure greater than the formation pressure, an aqueous solution containing a surfactant admixture, said admixture being formed from about one part by weight of (A) a member selected from the group consisting of a sulfated/sulfonated polyethoxy alkyl phenol, containing from about 8 to about 14 carbon atoms in the alkyl group and from about 4 to about 10 ethoxy groups, the corresponding alkali metal and ammonium salts and mixtures thereof, with (B) from about 1 to about 3 parts by weight of a member selected from the group consisting of a $C_8$–$C_{14}$ alkyl benzene sulfonic acid, the corresponding alkali metal and ammonium salts and mixtures thereof.

2. Method as claimed in claim 1 wherein said admixture is present in said aqueous solution in an amount of from about 0.05 to about 0.5 percent by weight.

3. Method as claimed in claim 1 wherein the admixture is formed from about one part by weight of said sulfated/sulfonated polyethoxy alkyl phenol to from about 1.2 to 2.75 parts by weight of said $C_8$–$C_{14}$ alkyl benzene sulfonic acid.

4. Method as claimed in claim 1 wherein the admixture is composed of sulfated/sulfonated tetraethoxy nonyl phenol and ammonium dodecyl benzene sulfate.

5. Method as claimed in claim 1 wherein the admixture is composed of sulfated/sulfonated hexaethoxy nonyl phenol and sodium decyl benzene sulfonate.

6. Method as claimed in claim 1 wherein the admixture is composed of sulfated/sulfonated octaethoxy nonyl phenol and ammonium dodecyl benzene sulfonate.

7. Method as claimed in claim 1 wherein the admixture is composed of sulfated/sulfonated polyethoxy nonyl phenol wherein the average number of ethoxy groups therein is about 9.5, and sodium decyl benzene sulfonate.

8. Method as claimed in claim 1 wherein a frac sand is also present in said solution.

9. Method as claimed in claim 1 wherein the said aqueous solution is injected down the well bore penetrating said formation under a pressure greater than the formation pressure and sufficient to create fractures in the formation.

10. Method as claimed in claim 1 wherein the said aqueous solution is injected down the well bore penetrating said formation under a pressure greater than the formation pressure but less than the pressure required to create fractures in the formation.

* * * * *